United States Patent [19]

Pfeiffer et al.

[11] Patent Number: 4,873,833
[45] Date of Patent: Oct. 17, 1989

[54] APPARATUS COMPRISING A HIGH-VACUUM CHAMBER

[75] Inventors: Loren N. Pfeiffer, Harding Township, Morris County; Kenneth W. West, Mendham Township, Morris County, both of N.J.

[73] Assignee: American Telephone Telegraph Company, AT&T Bell Laboratories, Murray Hill, N.J.

[21] Appl. No.: 276,082

[22] Filed: Nov. 23, 1988

[51] Int. Cl.[4] .............................................. B01D 8/00
[52] U.S. Cl. ...................................... 62/55.5; 55/269; 417/901
[58] Field of Search .................... 62/100, 268, 55.5; 55/269; 417/901

[56] References Cited

U.S. PATENT DOCUMENTS

| | | | |
|---|---|---|---|
| 3,252,652 | 5/1966 | Trendelenburg et al. | 62/55.5 |
| 3,423,947 | 1/1969 | Moriya | 62/55.5 |
| 3,443,390 | 5/1969 | Webb | 62/55.5 |
| 3,579,998 | 5/1971 | Thibault et al. | 62/55.5 |
| 3,585,807 | 6/1971 | Hevgevoss | 62/55.5 |
| 3,769,806 | 11/1973 | Boissin et al. | 62/55.5 |
| 4,514,204 | 4/1985 | Bonney et al. | 62/41 |
| 4,538,423 | 9/1985 | Le Diouron | 62/55.5 |
| 4,559,787 | 12/1985 | Batzer et al. | 62/55.5 |
| 4,607,491 | 8/1986 | Ishimaru et al. | 62/55.5 |

OTHER PUBLICATIONS

M. Michaud and L. Sanche "Characteristics of a Bakeable Ion–Cryopumped UHV System," *J. Vac. Sci. Technol.*, 17(1), Jan./Feb. 1980, pp. 274–276.

*Primary Examiner*—Ronald C. Capossela
*Attorney, Agent, or Firm*—Martin I. Finston; Eugen E. Pacher

[57] ABSTRACT

Apparatus comprising a bakeable high vacuum system using cryopumps is disclosed. Auxiliary cooling means in thermal contact with the primary pumping stage of the cryopump remove heat from the cryopump, whereby the walls of the cryopump may be heated during operation of the cryopump, such that the cryopump can be baked. This can result in substantially improved attainable pressure in the system.

8 Claims, 3 Drawing Sheets

TO VACUUM CHAMBER

APPARATUS COMPRISING A HIGH-VACUUM CHAMBER

FIELD OF THE INVENTION

This invention relates to apparatus comprising a high vacuum system, and, more particularly, to apparatus comprising a bakeable high vacuum system using a cryopump.

BACKGROUND OF THE INVENTION

Many technologically important processes have to be carried out in a high vacuum. Among such processes are semiconductor manufacturing processes such as molecular beam epitaxy (MBE). Frequently the quality of the resulting product strongly depends on the residual pressure in the vacuum processing chamber. This is, for instance, the case in the field of III–V semiconductors, where carrier mobility in at least some materials has been found to strongly depend on the vacuum-chamber pressure during MBE growth. Thus there exist strong incentives for carrying out such processes in the best vacuum (i.e., under the lowest pressure) that can be attained economically.

Any vacuum system comprises an evacuable chamber and means for removing gas from the chamber, typically one or more vacuum pumps. The pump is connected to the chamber in a manner that results in relatively low impedance for gas transport between the chamber and the pump.

Many different types of vacuum pumps are known. Among pumps capable of producing high vacuum are cryopumps, ion sputter pumps, getter pumps, and turbomolecular pumps. Of these, cryopumps have perhaps the most desirable combination of properties, among which are cleanliness and high pumping speed per invested dollar. It is probably for this reason that cryopumps are now increasingly being used in UHV apparatus.

A cryopump works by adsorbing gaseous molecules onto surfaces maintained at cryogenic temperatures by, exemplarily, a closed-cycle, gaseous helium refrigerator. The pumping surfaces typically are enclosed within a cylindrical stainless-steel canister which is flanged on the open end for joining to a pumping port of a vacuum chamber. The operation of cryopumps is described, for example, in J. F. O'Hanlon, *A User's Guide to Vacuum Technology*, John Wiley and Sons, New York, 1980.

In any otherwise leak-free vacuum system, gas enters the open volume of the vacuum chamber by surface desorption from the chamber walls or permeation through the walls. The ultimate vacuum attainable may be determined by the competition between the pumps and such outgassing or permeation. The room-temperature outgas rate can be drastically reduced by preliminarily baking the walls of the vacuum system, typically at a temperature between 200° C. and 300° C., while pumping to maintain the vacuum within the system.

The far-UHV (Ultra-High Vacuum) region comprises the pressure range below approximately $10^{-9}$ Pa. (1 Torr is approximately equal to 133 Pa.) Base pressures in this range are important, exemplarily, in the growth of advanced materials by molecular beam epitaxy. During MBE growth, residual gases in the vacuum chamber may be a significant source of contamination of the product. For that reason, far-UHV conditions are needed in order to achieve desired high levels of material purity and structural perfection.

In order to reach the far-UHV region, a vacuum system must be bakeable to the maximum extent possible. In other words, the greatest possible fraction of the inner surface of the system must be desorbed by heating to substantially eliminate outgassing during subsequent, post-bake operation, with the exception of surfaces that are maintained at cryogenic temperatures during operation.

The following example demonstrates the importance of maximum bakeability. Far-UHV systems are preferentially made of stainless steel. The 22° C. outgas rate of unbaked stainless steel drops from $10^{-7}$ Pa-m/s to $10^{-11}$ Pa-m/s after a 100-hour bake in UHV at 200° C. Thus if only 1% of the 22° C. stainless-steel surface of a UHV system is left unbaked, it will surely become the dominant outgas source of the entire system, and limit the attainable vacuum. As already noted, however, there is no need to bake the cryogenic surfaces within the pump, because their outgas rates during operation will be negligible even at $10^{-12}$ Pa.

Closed-cycle, gaseous helium-cooled cryopumps potentially offer distinct advantages as far-UHV pumps: they are oil-free, can be made to pump all gases, do not suffer from unintentional regurgitation, and provide as much as ten times the pumping speed per dollar as other types of UHV pumps. However, commercially available cryopumps cannot be UHV baked. The thermal load that would be seen by the cryopump if its stainless-steel walls were baked would have to be absorbed by the first refrigeration stage shield (the "primary pump stage") nominally held at 77° K. This thermal load during baking typically can not be handled by the cooling system of prior art pumps, as is demonstrated by the following example, which is based on a typical commercially available cryopump. The exemplary cryopump has a cooling capacity of 50 watts at the first stage using the largest optional compressor provided by the manufacturer. This is less than 25% of the thermal power delivered to the pump by the walls of the cryopump when it is baked at 200° C.

Despite the problem of outgassing from the canister, non-bakeable cryopumps have been installed on many bakeable vacuum systems. One approach to the outgas problem has been to baffle the pumping path between the cryopump and the vacuum chamber in order to reduce the thermal load to the cryopump during the baking of the vacuum chamber. This measure is not very satisfactory because it reduces the pumping speed, and it does not provide for outgassing of the baffle or pump walls.

One way to make the cryopump bakeable is to provide for the temporary removal of heat-sensitive mechanical parts. For example, one published report (see M. Michaud and L. Sanche, "Characteristics of a Bakeable Ion-Cryopumped UHV System," *J. Vac. Sci. Technol.*, 17 (1), January/February 1980, pages 274–276) describes a bakeable UHV system comprising a modified cryopump and an auxiliary ion pump, both communicable with the UHV chamber. In order to make the cryopump bakeable, heat-resistant materials were substituted for heat-sensitive materials within the pump. However, before baking the pump, it was necessary to remove mechanical components of the pump refrigeration system. During bakeout, the cryopump was not operated, and vacuum pumping was provided only by the auxiliary ion pump. A steady-state vacuum-chamber pressure of $1.3 \times 10^{-8}$ Pa was achieved by this means, and the pressure could for a limited time be brought down to $8.0 \times 10^{-9}$ Pa.

Removal of heat-sensitive mechanical components is similarly taught in U.S. Pat. No. 4,514,204. The cryopump disclosed in this reference comprises a cryogenic refrigerator whose displacer end can be removed from the cryopump housing without loss of vacuum. During bakeout, the refrigeration means that were removed can be used through a non-heated port to continue pumping, thus obviating the need for a separate ion pump to maintain the vacuum during bakeout.

Although prior-art bakeable cryopumps with removeable refrigerators offer advantages over non-bakeable cryopumps, they are inconvenient to operate and during bakeout they require costly ancillary pumping equipment which may itself be disadvantageous. For example, ion pumps suffer from the re-emission of previously pumped gases, and the use of a non-heated auxiliary port for continued cryopumping partially defeats the purpose of having a bakeable pump. Thus there is a need for a bakeable vacuum system, comprising a bakeable cryopump, in which the cryopump can be operated during bakeout. This application discloses such a system.

SUMMARY OF THE INVENTION

Disclosed is apparatus that comprises an evacuable chamber and a cryopump, and that further comprises auxiliary cooling means adapted for removal of heat from the primary pumping stage of the cryopump, such that a larger fraction of the relevant surface area of the vacuum system can be baked while the cryopump is operating.

Typically, the apparatus comprises an evacuable bakeable chamber, at least one cryopump communicating with the chamber such that gas can be removed from the chamber, and auxiliary cooling means. The cryopump comprises a primary pumping stage that is maintained, during normal operation of the cryopump, at a temperature $T_p$ substantially below room temperature. The auxiliary cooling means comprise means for conducting a cryogenic fluid adjacent the primary pumping stage of the cryopump, the conducting means having relatively high thermal conductivity, and means for thermally conductively connecting the primary pumping stage of the cryopump to the conducting means, such that during bake-out of the chamber the primary pumping stage can be maintained at a temperature that is not substantially higher than $T_p$.

In a currently preferred embodiment, the auxiliary cooling means comprise an outer member (frequently to be termed a "flanged mounting ring") that can be incorporated into the outer wall of the vacuum system. The auxiliary cooling means further comprise a tube constructed of copper or other high thermal conductivity material for bringing a cryogenic fluid (e.g., liquid nitrogen) into effective thermal contact with the primary pumping stage of the cryopump. A conduit through the flanged mounting ring is provided such that the cryogenic fluid can be introduced from outside of the vacuum system into one end of the tube and can exit to the outside of the system from the other end of the tube, and mounting blocks are provided for connecting the tube to the primary pumping stage in thermally conductive fashion.

DETAILED DESCRIPTION OF A PREFERRED EMBODIMENT

Figure 1:
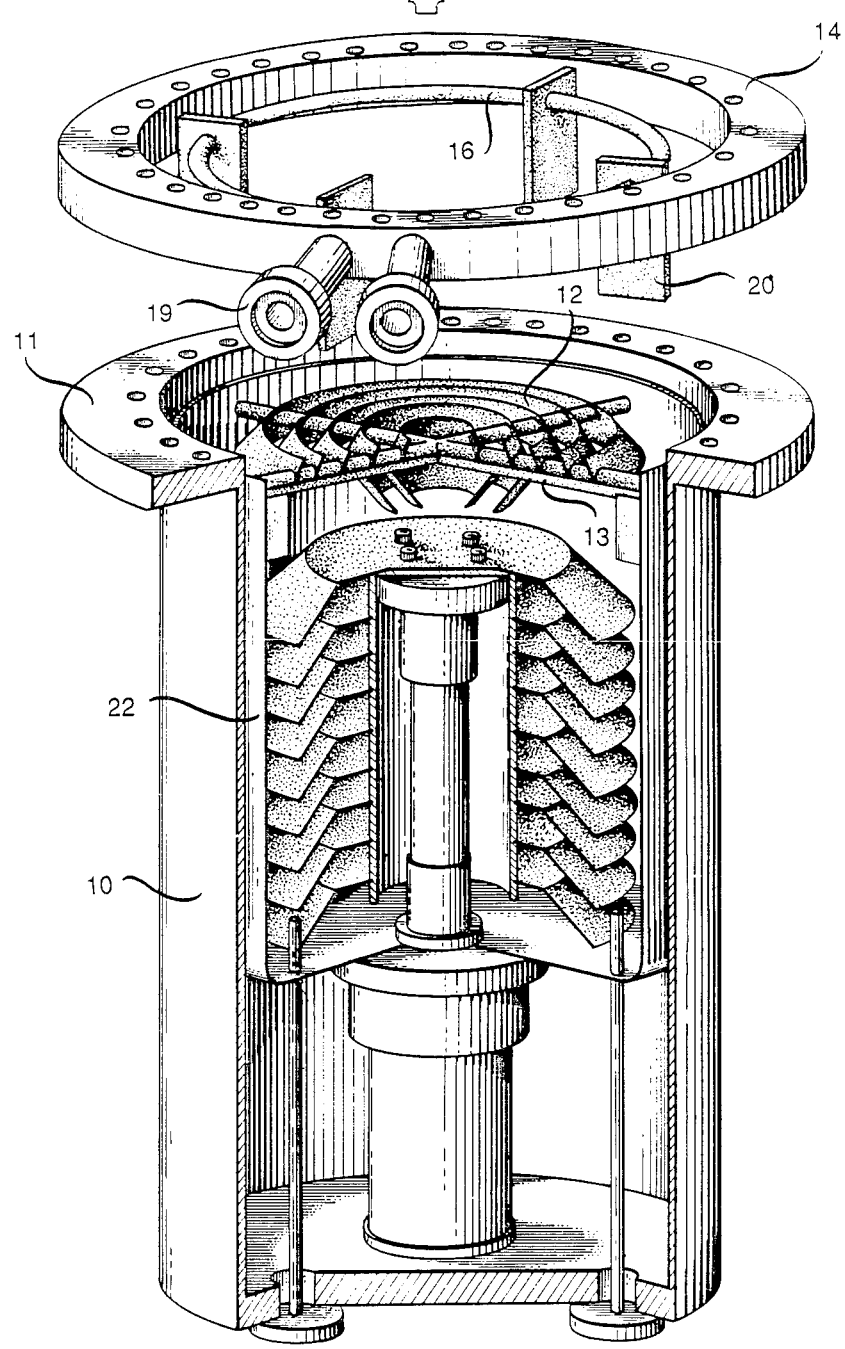
FIG. 1 is a schematic representation of a cryopump with exemplary auxiliary cooling means according to the invention.
Figure 2:
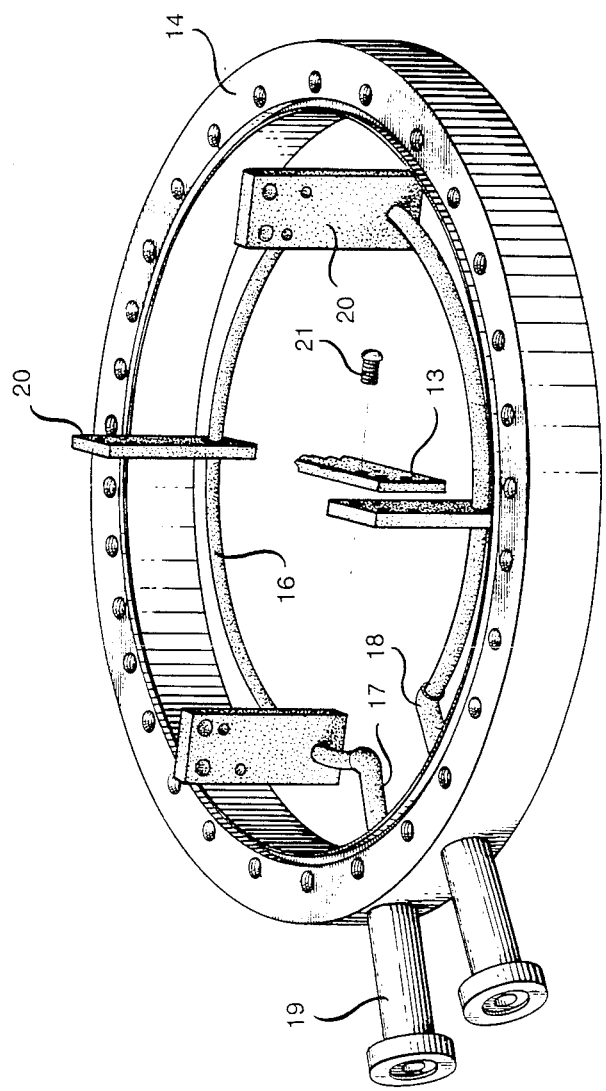
FIG. 2 is a perspective view of exemplary auxiliary cooling means according to the invention. The cooling means are shown upside down for clarity only.

FIG. 1 schematically depicts a cryopump with exemplary auxiliary cooling means. FIG. 2 is a perspective view depicting exemplary auxiliary cooling means in greater detail (shown upside down for clarity). The following discussion is in reference to these two figures.

The cryopump comprises a canister (10) which is closed at one end and which at the open end terminates in a mounting flange (11). Within the canister (10) is the primary-stage thermal shield (22). Also within the canister is the primary condensor array, comprising a multiplicity of chevrons (12) supported by a multiplicity of support ribs (13). The exemplary auxiliary cooling means comprise a flanged mounting ring (14) which sealingly mates to the mounting flange (11) of the cryopump on one side, and, typically, to a port of an evacuable vacuum chamber (not shown) on the other. Within the flanged mounting ring (14) and substantially coaxial therewith is provided a basically ring-shaped tube (16) for conducting cryogenic fluid. The ring-shaped tube will herein frequently be referred to as a "cryoring."

The cryoring (16) is advantageously made of a high-thermal-conductivity material, preferably copper. The ends of the cryoring advantageously are continuous with sections of tubing (17, 18) made from a lower-thermal-conductivity material, preferably stainless steel. The stainless-steel sections (17, 18) bend outward and pass in known fashion through high-vacuum feedthroughs (19) extending through the flanged mounting ring (14) from the inside to the outside of the vacuum system.

A cryogenic fluid, preferably liquid nitrogen but not excluding a cryogenic gas, can be introduced into one end of the cryoring through one of the low-conductivity sections (e.g., 17), conducted around the cryoring, and extracted from the other end of the cryoring (possibly after having undergone a phase change) through the other section (e.g., 18). A low-temperature valve (not shown) can be used to control the flow of liquid nitrogen into the cryoring. After use of the cryoring, a purge gas, exemplarily nitrogen, may be forced through the cryoring to drive out residual liquid nitrogen. A gas valve (not shown) may be used to control the flow of purge gas into the cryoring.

Means for thermally coupling the cryoring and the primary condensor array are provided. These may comprise a multiplicity of copper mounting blocks (20) that make thermal contact between the former and the latter. Exemplarily, each mounting block (20) has a round hole substantially equal to the outer tube diameter of the cryoring (16). The cryoring passes through the holes in the mounting blocks, and the facing surfaces of the cryoring and the mounting blocks are hard soldered together in a hydrogen atmosphere and without flux, whereby good thermal contact is established between the cryoring and the mounting blocks. The mounting blocks (20) are thermally coupled to the primary condensor array; exemplarily they are bolted to the support ribs (13) of the primary condensor array with bolts (21) made of high-thermal-conductivity material, preferably copper, and indium-foil gaskets (not shown).

Although the preferred embodiment described here comprises a flanged mounting ring for mounting the cryoring, other embodiments are also envisioned. For example, we envision an embodiment wherein the cryoring is an integral part of the cryopump and the stainless-steel sections (17, 18) pass through the cryopump canister wall.

Figure 3:
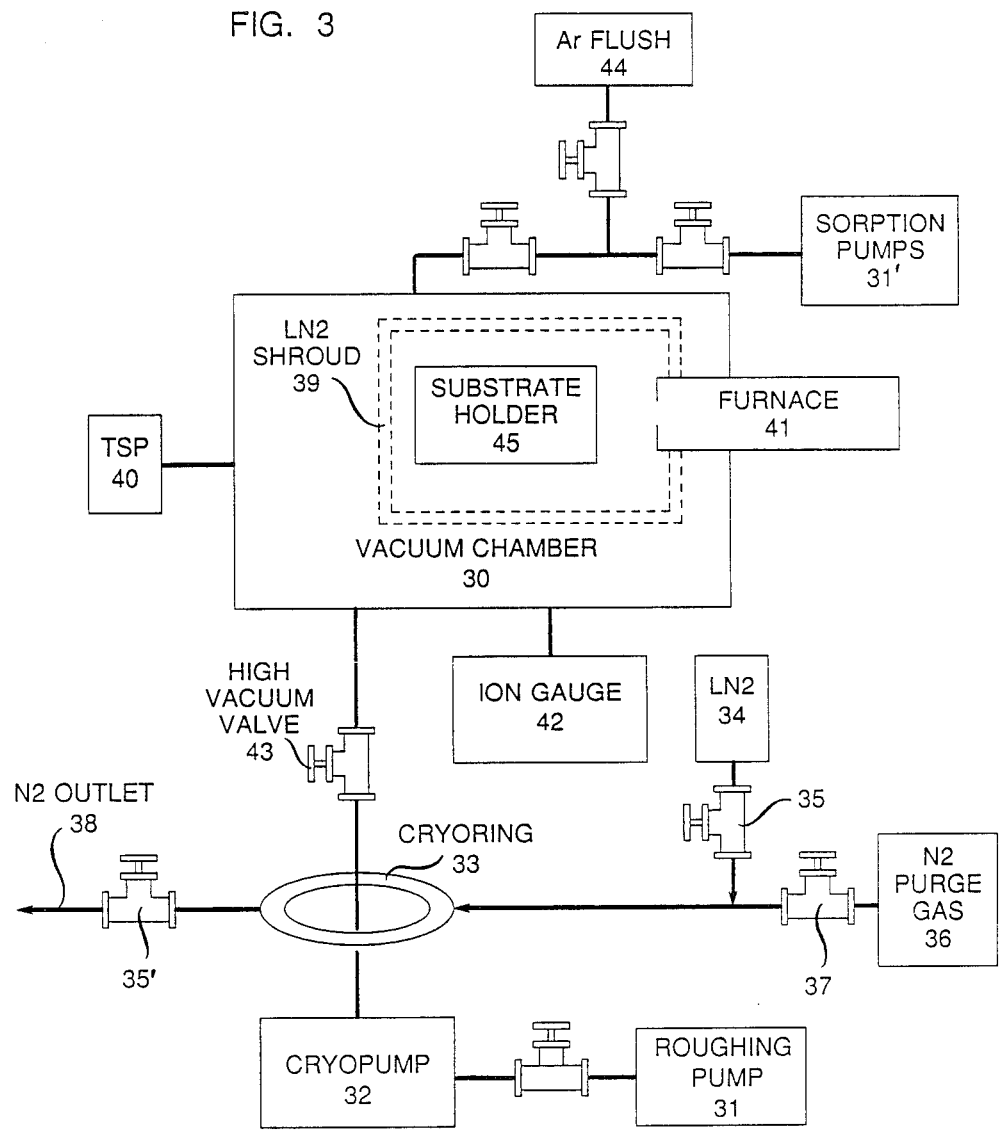
FIG. 3 is a schematic representation of exemplary apparatus according to the invention, namely, a system for molecular beam epitaxy that comprises auxiliary cooling means.

An exemplary apparatus according to the invention is represented in FIG. 3, which schematically depicts a cryopumped MBE system. The MBE system comprises a vacuum chamber (30), roughing pumps (31 and 31'), a cryopump (32), a cryoring (33), a liquid nitrogen reservoir (34), a low-temperature valve (35) for controlling the flow of liquid nitrogen into the cryoring, a low-temperature valve (35') for sealing the outlet end of the cryoring after use, a source (36) of nitrogen purge gas, a valve (37) for controlling the flow of purge gas, a nitrogen outlet (38), liquid-nitrogen fillable shrouds (39) within the vacuum chamber, a titanium sublimation pump (40) primarily for removing residual hydrogen from the chamber, source furnaces (41) for MBE, an ion gauge (42) for measuring the chamber pressure at high vacuum, high-vacuum gate valves (43) for isolating the cryopumps, a source of purified argon flush gas (44), and a substrate holder (45) for MBE.

An examplary method of use of apparatus according to the invention (exemplified by the exemplary MBE system of FIG. 3) is described hereinbelow. Many steps of the method are well known to those skilled in the art and do not require mention or detailed discussion. The vacuum chamber is rough pumped down to the upper end of the operating pressure range of the cryopump. This pressure range is variable depending on the manufacturer and model of the cryopump and the operating conditions, but is typically below about 100 Pa. The cryopump is then used to reduce the pressure in the vacuum chamber to the range of $10^{-6}$ Pa. A flow of liquid nitrogen is initiated in the cryoring. The pressure of about $10^{-6}$ Pa is maintained by the cryopump, with auxiliary cooling by the cryoring, while the temperature of the walls of the vacuum chamber (including the cryopump) is uniformly and gradually raised to about 220° C. The duration of the heating step typically will depend on the ultimate pressure that is desired and may be as long as 5 weeks. After completion of the "bake-out," the system is allowed to cool to room temperature, the liquid nitrogen supply to the cryoring is shut off, and the cryoring is purged and sealed. Then the internal shrouds are filled with liquid nitrogen, an optional titanium sublimation pump is activated, and the MBE source furnaces are turned up to idle. Preparatory to making an epitaxial structure, the source furnaces are raised to their operating temperatures. A calibration run is performed to measure the deposition rate in monolayers per second from each source. The bare substrate, which is typically gallium arsenide, is heated within the vacuum chamber to remove the surface gallium oxide layer by volatilization. The substrate is then placed within the substrate holder and exposed to beams of source material. The beams of source material are modulated by shutters that are, typically, under the control of a programmed set of instructions.

In an exemplary run that involved 5 weeks of bake-out, two days after completion of the bake-out a Leybold IM 520 extractor ion gauge, which is not subject to the internal x-ray limited reading of conventional Bayard-Alpert gauges, indicated a system pressure of $2.0 \times 10^{-10}$ Pa.

In an exemplary run using apparatus and conditions substantially similar to those described hereinabove, but without using a cryoring and thus without baking out the cryopump canister, an ultimate system pressure of about $1.6 \times 10^{-9}$ Pa was obtained.

The principles of this invention may be incorporated into many different cryopump designs and applications. For example, an alternative embodiment might comprise a cryoring that thermally contacts the primary-stage thermal shield of the cryopump instead of the primary condensor array. As a further example, the cryoring might be configured in a shape other than a ring, exemplarily a spiral. Other exemplary applications of the invention are for producing high vacuums in particle accelerators, and in space simulation chambers.

We claim:

1. Apparatus comprising a high-vacuum system, comprising:
   an evacuable bakeable chamber and at least one cryopump communicating with the chamber such that gas can be removed from the chamber, the cryopump comprising a primary pumping stage that is maintained, during normal operation of the cryopump, at a temperature $T_p$ substantially below room temperature,
   characterized in that
   the apparatus further comprises:
   (a) means for conducting a cryogenic fluid adjacent the primary pumping stage of the cryopump, the conducting means having relatively high thermal conductivity; and
   (b) means for thermally conductively connecting the primary pumping stage of the cryopump to the conducting means, such that during bake-out of the chamber the primary pumping stage can be maintained at a temperature that is not substantially higher than $T_p$.

2. The apparatus of claim 1, wherein the conducting means is adapted to receive cryogenic fluid from a source external to the cryopump and external to the vacuum system.

3. The apparatus of claim 2, wherein:
   (a) the conducting means comprises a copper tube; and
   (b) the thermally conductively connecting means comprises at least one copper mounting block connected to the copper tube.

4. The apparatus of claim 3, wherein the copper tube is configured substantially in the shape of a ring.

5. The apparatus of claim 4, wherein the cryogenic fluid is liquid nitrogen.

6. The apparatus of claim 5, further comprising:
   (a) at least one low-temperature valve for controlling the flow of liquid nitrogen through the copper tube; and
   (b) at least one valve for controlling the flow of purge gas for expelling residual coolant from the copper tube.

7. The apparatus of claim 1, wherein the cryopump comprises the means for conducting the cryogenic fluid.

8. Apparatus comprising an evacuable chamber and at least one cryopump for removing gas from the chamber, the cryopump comprising a mounting flange and a primary pumping stage, the primary pumping stage further comprising a primary condensor array, characterized in that the apparatus further comprises:
(a) a mounting ring having first and second faces, the first face being adapted for sealingly attaching to the mounting flange of the cryopump and the second face being adapted for sealingly attaching to the evacuable chamber;
(b) a copper tube for conducting liquid nitrogen adjacent the primary condensor array, the copper tube having first and second ends and being configured substantially in the shape of a ring;
(c) at least one low-temperature valve for controlling the flow of liquid nitrogen through the copper tube;
(d) at least one purge valve for controlling the flow of purge gas for expelling residual liquid nitrogen from the copper tube;
(e) at least one copper mounting block mounted to the copper tube and to the primary condensor array for thermally conductively attaching the copper tube to the primary condensor array;
(f) a conduit for conducting liquid nitrogen from the low-temperature valve and purge gas from the purge valve through the mounting ring to the first end of the copper tube; and
(g) a conduit for conducting liquid nitrogen and purge gas from the second end of the copper tube through the mounting ring.

* * * * *